(12) United States Patent
Schumann et al.

(10) Patent No.: US 10,365,466 B2
(45) Date of Patent: Jul. 30, 2019

(54) METHOD AND MICROSCOPE FOR IMAGING A VOLUME SAMPLE

(71) Applicant: LEICA MICROSYSTEMS CMS GMBH, Wetzlar (DE)

(72) Inventors: Christian Schumann, Giessen (DE); Andrea Muelter, Heidelberg (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 280 days.

(21) Appl. No.: 15/117,731

(22) PCT Filed: Feb. 9, 2015

(86) PCT No.: PCT/EP2015/052612
§ 371 (c)(1),
(2) Date: Nov. 25, 2016

(87) PCT Pub. No.: WO2015/121190
PCT Pub. Date: Aug. 20, 2015

(65) Prior Publication Data
US 2017/0168280 A1 Jun. 15, 2017

(30) Foreign Application Priority Data
Feb. 12, 2014 (DE) .......... 10 2014 101 762

(51) Int. Cl.
*G02B 7/04* (2006.01)
*G02B 21/02* (2006.01)
(Continued)

(52) U.S. Cl.
CPC .............. *G02B 21/02* (2013.01); *G02B 7/04* (2013.01); *G02B 21/241* (2013.01);
(Continued)

(58) Field of Classification Search
CPC .... G02B 21/006; G02B 21/02; G02B 21/241; G02B 21/244–247; G02B 21/36;
(Continued)

(56) References Cited

U.S. PATENT DOCUMENTS

| | | | |
|---|---|---|---|
| 2005/0024718 A1* | 2/2005 | Sase | G02B 21/361 |
| | | | 359/368 |
| 2010/0214653 A1 | 8/2010 | Pacholik et al. | |
| 2013/0010367 A1 | 1/2013 | Schek | |

FOREIGN PATENT DOCUMENTS

| | | |
|---|---|---|
| DE | 3804642 A1 | 10/1988 |
| DE | 102005032354 A1 | 1/2007 |

(Continued)

*Primary Examiner* — Stephone B Allen
*Assistant Examiner* — Adam W Booher
(74) *Attorney, Agent, or Firm* — Leydig, Voit & Mayer, Ltd.

(57) ABSTRACT

A method for microscopically imaging a volume sample includes focusing a microscope objective having a correcting element successively in at least two reference planes which are located within the volume sample at different volume sample depths along the optical axis of the microscope objective; determining, for each reference plane, a reference setting of the correcting element in which an imaging error which is dependent upon the volume sample depth is corrected by the correcting element; determining, on the basis of the reference settings determined for at least one target plane in the volume sample, a target setting for the correcting element in which the imaging error occurring at the volume sample depth of the target plane is corrected by the correcting element; and focusing the microscope objective on the target plane and bringing the correcting element into the target setting in order to image the volume sample.

16 Claims, 5 Drawing Sheets

(51) Int. Cl.
*G02B 21/24* (2006.01)
*G02B 27/00* (2006.01)
(52) U.S. Cl.
CPC ..... *G02B 27/0012* (2013.01); *G02B 27/0025* (2013.01); *G02B 27/0068* (2013.01)
(58) Field of Classification Search
CPC ...... G02B 21/365; G02B 21/367; G02B 7/04; G02B 7/08; G02B 7/09; G02B 27/0012; G02B 27/0025; G02B 27/0068
See application file for complete search history.

(56) References Cited

FOREIGN PATENT DOCUMENTS

| | | |
|---|---|---|
| DE | 102007038579 A1 | 2/2009 |
| DE | 102010039746 A1 | 3/2012 |
| DE | 102011051677 A1 | 1/2013 |
| WO | WO 2009096522 A1 | 8/2009 |

* cited by examiner

METHOD AND MICROSCOPE FOR IMAGING A VOLUME SAMPLE

CROSS REFERENCE TO RELATED APPLICATIONS

This application is a U.S. National Stage Application under 35 U.S.C. § 371 of International Application No. PCT/EP2015/052612 filed on Feb. 9, 2015, and claims benefit to German Patent Application No. DE 10 2014 101 762.5 filed on Feb. 12, 2014. The International Application was published in German on Aug. 20, 2015 as WO 2015/121190 A1 under PCT Article 21(2).

FIELD

The invention relates to a method for microscopically imaging a volume sample and to a microscope.

BACKGROUND

In light microscopy of three-dimensionally extended samples, also designated below also as volume samples, high-quality three-dimensional imaging is of key interest. One of the challenges here is presented by imaging errors which are caused by the path of the light in the sample. In this case, in particular attention needs to be paid to so-called spherical aberrations, which result from the fact that the index of refraction of the volume sample is different from the index of refraction of the medium surrounding the sample. The longer the path of the light within the sample, the greater the spherical aberration caused by such maladjustment of the index of refraction. As a result it is particularly difficult to precisely image object planes which are located deep inside the volume sample. If the index of refraction of the sample varies along the optical axis of the microscope objective, i.e. in the direction of the sample depth, it becomes even more difficult to achieve high-quality three-dimensional imaging of the sample.

In order to prevent the imaging errors described above, immersion objectives are generally used, which comprise correcting elements which are adjustable for correction of the spherical aberration. Such correcting elements which are known from the prior art have, for example, lens mounts which are adjustable by means of a motor and by which a lens unit contained in the microscope objective can be displaced along the optical axis for correction of the imaging error. An example of such a correcting adjustment is disclosed in DE 10 2011 051 677 A1.

If the spherical aberration caused by a maladjustment of the index of refraction is to be corrected in a wide axial range, it is necessary to provide the correcting element with a specific refractive power. As a result, during the correcting adjustment, an unwanted change to the object focal distance can occur, i.e. a displacement of the imaged object plane along the optically axis. Such a change to the object focal distance then leads to an intolerable distortion of the recorded volume image.

With regard to the prior art, reference is also made to concepts which provide a depth-dependent adjustment of microscopy parameters, for example the laser power in multiphoton microscopes. However, these parameters do not influence the correction of the microscope objective with respect to its imaging performance or its focal distance setting. Thus the current prior art does not allow high-quality microscopic volume imaging which is extensive in the axial direction, in particular in samples which have an inhomogeneous index of refraction above the sample depth.

SUMMARY

In an embodiment, the present invention provides a method for microscopically imaging a volume sample. The method includes focusing a microscope objective having a correcting element successively in at least two reference planes which are located within the volume sample at different volume sample depths along an optical axis of the microscope objective; determining, for each reference plane, a reference setting of the correcting element in which an imaging error which is dependent upon the volume sample depth is corrected by the correcting element; determining, on the basis of the reference settings, for a target plane in the volume sample, a target setting for the correcting element in which the imaging error occurring at the volume sample depth of the target plane is corrected by the correcting element; and focusing the microscope objective on the target plane and bringing the correcting element into the target setting in order to image the volume sample.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
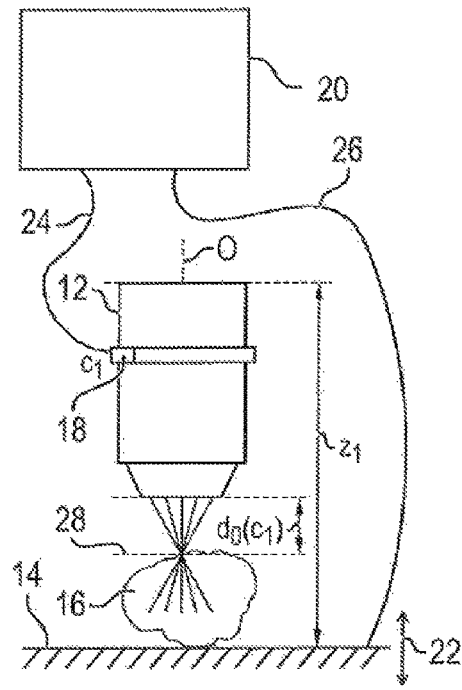
FIG. 1 is a schematic view of a microscope objective according to an embodiment of the invention which, when the correcting element is correctly set, is focused on a first reference plane.

In embodiments of the invention, a method and a microscope are provided which enable a volume sample to be imaged in an error-free manner in a wide range along the optical axis.

A method according to an embodiment of the invention includes focusing a microscope objective having a correcting element successively on at least two object planes which serve as reference planes and are located inside the volume sample at different sample depths along the optical axis of the microscope objective. For each reference plane, a reference setting of the correcting element is determined, in which an imaging error which is dependent upon the sample depth is corrected by the correcting element. For at least one target plane in the sample, a target setting for the correcting element, in which the imaging error occurring at the sample depth of the target plane is corrected by the correcting element, is then determined on the basis of the determined reference settings. Finally, in order to image the volume sample, the microscope objective is focused on the target plane and the correcting element is moved into the target setting.

As the microscope objective is focused by means of a focusing device on at least two reference planes, the sample region to be imaged is specified along the optical axis, i.e. the volume to be examined microscopically. Within the context of this specification of the volume to be examined microscopically, which is preferably carried out in a setup process preceding the actual image recording, for the at least two reference planes which are located at different sample depths inside the sample, reference settings are determined for the correcting element in such a way that in these reference settings the imaging error which is dependent upon the sample depth is corrected in the required manner by the correcting element in each case. In this case, the reference settings of the correcting element can be determined manually by the user or automatically with the aid of a control unit suitable for this purpose.

The reference settings of the correcting element determined for the reference planes are then used to determine a target setting for the correcting element for at least one, but usually for a plurality of, target planes in each case, which target setting later ensures that the depth-dependent imaging error occurring in the particular target plane is corrected in the best possible manner when imaging said target plane. In this case, the target planes lie within the imaging region defined by the reference planes along the optical axis.

Thus the reference settings intended for the individual reference planes form nodes so to speak, which can then be used when three-dimensionally imaging the volume sample in order to achieve the desired correction of the depth-dependent imaging error in any target plane inside the volume to be examined microscopically. In this case, the target planes sought in the three-dimensional imaging of the volume sample in each case will generally not correspond to the reference planes previously defined when setting up the microscope. However, it should be pointed out that such a coincidence between the target planes and the reference planes is not ruled out either, i.e. the target plane considered in each case also has to coincide with one of the previously defined reference planes.

In a particularly preferred embodiment of the method, for each reference plane a deviation of the object focal distance of the microscope objective relative to a target focal distance, which deviation is caused by the correcting element in the particular reference setting, is determined as a reference focal distance deviation. Then, on the basis of the reference focal distance deviations determined for the individual reference planes, a target focal distance deviation is determined for the target plane, which represents the deviation, caused by the correcting element in the target setting, of the object focal distance relative to the target focal distance. Finally, the microscope objective is focused on the target plane, taking account of the target focal distance deviation.

In a particularly advantageous manner, this configuration makes it possible to take into account and to correct the effect of the correcting adjustment on the object focal distance of the microscope objective, i.e. on the axial position of the object plane, on which the microscope objective is currently focused. Thus in particular an undesirable axial displacement of the object plane which is caused by the correcting element is compensated by taking account of the determined target focal distance deviation when focusing the microscope objective on the target plane to be imaged. For this purpose, first of all it should be determined how the particular adjustment of the correcting element affects the object focal distance of the microscope objective. A precise knowledge of the effect of the correcting adjustment can be obtained for example by means of a suitable test sample or during setting up of the microscope by iterative adjustment of the correcting element and subsequent refocusing of the microscope objective. In a preferred embodiment, however, it is likewise possible to obtain the knowledge of the effect of the correcting adjustment on the object focal distance solely from the knowledge of the optical design of the microscope objective, and to numerically determine the target focal distance deviation on the basis of this knowledge.

Taking account of the change to the object focal distance caused by the correcting element enables a substantially free choice of the correcting element to be used. Thus, in particular it is not necessary for the correcting element used to exhibit the lowest possible refractive power in order to prevent any kind of change to the object focal distance from the outset. Since major maladjustments of the index of refraction, such as occur in particular in axially extended volume samples, can also be compensated for by higher refractive powers, the method according to an embodiment of the invention thus enables precise three-dimensional imaging even of large volume samples.

Preferably, on the basis of the reference focal distance deviations, a focal distance rule is determined which indicates the deviation of the object focal distance on the basis of the setting of the correcting element. The target focal distance deviation used when capturing the volume image is then determined using this focal distance rule. The above-mentioned focal distance rule can be stored for example in the form of a suitably parameterized function or a value table, by means of which the target focal distance deviation is calculated by means of mathematical interpolation. The interpolation can be carried out for example according to a linear or cubic method or a spline method.

Similarly, in a preferred development of the method according to an embodiment of the invention, on the basis of the reference settings of the correcting element, a correction rule can be determined which indicates the setting of the correcting element, which setting is provided for correcting the imaging error, depending on the sample depth. The target setting of the correcting element can then be determined, in particular by interpolation, using this correction rule.

If not only the object focal distance, but also the focal length of the microscope objective and thus also the magnification thereof changes on the basis of the setting of the correcting element, a deviation of the magnification of the microscope objective relative to a target magnification, which deviation is caused by the correcting element in the particular reference setting, is preferably determined for each reference plane as a reference magnification deviation. Then, on the basis of the reference magnification deviations determined for the respective reference planes, for the target plane a target magnification deviation is determined which indicates the deviation, caused by the correcting element in the target setting, of the magnification relative to the target magnification. Finally, in order to compensate for the change in magnification caused by the correcting element, a variable magnifying element is adjusted, taking account of the target magnification deviation. This compensation for the magnification or object focal length changed by the correcting element preferably takes place in real time simultaneously with the correction of the imaging error and the correction of the change in focal distance. The variable magnifying element can be formed for example as a variable camera adapter or as part of a scanning system of a confocal or multiphoton microscope.

In a further advantageous modification, at least one reference control parameter is specified for each reference plane. On the basis of the reference control parameters thus specified, a target control parameter is then determined and set for the target plane. An example of such a reference control parameter is for instance the light power, by which the respective target plane is illuminated when imaging the volume sample. In this way, a uniform image brightness can be achieved over the entire microscopically examined volume. A further example in multiphoton microscopy is the so-called prechirp for compensation of the dispersion of the sample.

The at least two reference planes preferably comprise a plurality of planes which are equidistant along the optical axis. Since in this case the reference planes defined during setting up of the microscope are equally spaced apart from one another along the optical axis, the reference settings of the correcting element determined for the reference planes form a reliable basis on which a precise target setting for the correcting element and thus a good correction of the imaging error occurring at the particular sample depth can be found in each case in all possible target planes inside the volume to be examined microscopically.

In order to focus the microscope objective on the object plane desired in each case, the microscope objective has to be moved along the optical axis relative to the volume sample. This can take place by means of a focusing device which engages on the microscope objective or on an object plate supporting the volume sample. Thus, in the first embodiment the focusing device moves the microscope objective in space, whilst the object plate remains stationary. Conversely, in the second embodiment the object plate is moved in space whilst the microscope objective is held in position. A combination of these two focusing modes is also conceivable.

According to a further embodiment of the invention, a microscope for imaging a volume sample is provided, which comprises a microscope objective, a correcting element, a focusing device and a control unit. In this case, the control unit is designed so that the microscope objective, the correcting element and the focusing device are actuated in the manner explained above.

In a microscope according to an embodiment of the invention, the correcting element preferably comprises a lens unit contained in the microscope objective and a drive unit for moving the lens unit along the optical axis.

If, in the microscope, the deviation of the object focal distance caused by the correcting element is taken into consideration in the manner explained above, it is possible to provide the lens unit with a refractive power which is so high that even large variations of the index of refraction within the volume sample can be corrected.

In a particularly preferred embodiment, the drive unit comprises a correction collar which is arranged on a housing of the microscope objective and is rotatable about the optical axis, the rotary movement of said correction collar being convertible into a displacement movement of the lens unit along the optical axis. This embodiment of the correcting element can be realized for example in the manner disclosed in DE 10 2011 051 677 A1, which was referred to at the outset, and the disclosure of which is incorporated in the present application at this point by reference thereto.

Figure 3:
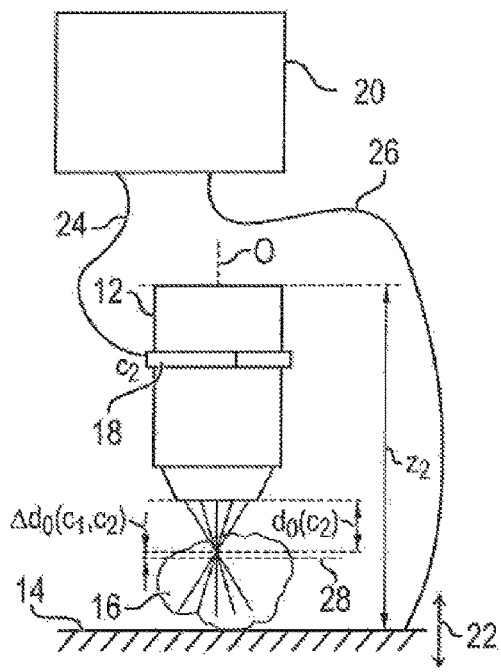
FIG. 3 is a schematic view corresponding to FIG. 2, showing a focal distance deviation which is caused by the correcting element set to the second reference plane.
Figure 4:
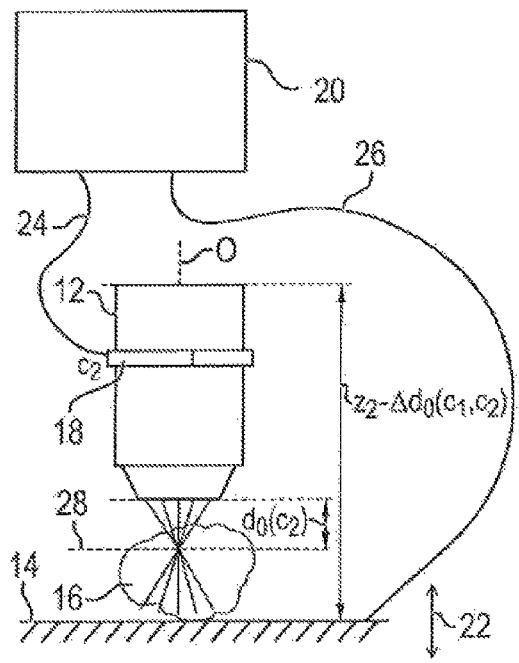
FIG. 4 is a schematic view corresponding to FIG. 3, showing a focal distance correction for the second reference plane.

With reference to FIGS. 1 and 4, first of all it will be explained in very basic terms how a spherical aberration caused by a maladjustment of the index of refraction as well as a change to the object focal distance caused by the correction of the spherical aberration are corrected according to the invention. In this connection, in FIGS. 1 to 4 the microscope components and the parameters which are relevant for the correction of the spherical aberration and the readjustment of the object focal distance are illustrated purely schematically in order to simplify the explanation of the method according to the invention.

According to FIGS. 1 to 4, a microscope designated generally by reference numeral 10 designated comprises a microscope objective 12, an object plate 14, on which a volume sample 16 is arranged, a correcting element 18, which in the present embodiment is part of the microscope objective 12, as well as a control unit 20. Furthermore, the microscope 10 has a focusing device by which the object plate 14 supporting the volume sample 16 can be moved along the optical axis O relative to the microscope objective 12. The focusing device is designated purely schematically in FIGS. 1 to 4 by a double-headed arrow 22. Like the correcting element 18, the focusing device 22 is also controlled by means of the control unit 20. For this purpose, the correcting element 18 and the focusing device 22 are coupled to the control unit 20 by means of connecting lines 24 and 26, respectively.

The correcting element 18 has a lens unit which is part of an optical imaging system contained in the microscope objective but not shown in FIGS. 1 to 4. In order to correct a spherical aberration caused by a maladjustment of the index of refraction in the manner described below, the correcting element 18 can be moved by means of the control unit 20 along the optical axis O.

FIG. 1 shows a state in which the microscope objective 12 is focused on an object plane 28. In this case, in the state illustrated in FIG. 1, the correcting element 18 should be set along the optical axis O so that the spherical aberration is corrected in the best possible way by the correcting element 18. This best-possible correction setting is designated by $c_1$ in FIG. 1.

The object plane 28 forms a first reference plane, for which the desired setting $c_1$ of the correcting element 18, designated below as the first reference setting, is determined.

In the state according to FIG. 1, the first reference plane 28 lies inside the sample 16, along the optical axis O, at a location corresponding to the object focal distance of the microscope objective 12. This object focal distance which is dependent upon the reference setting $c_1$ is designated by $d_0(c_1)$ in FIG. 1. The object focal distance $d_0(c_1)$ indicates the distance of the object plane, which is formed by the first reference plane 28, from the microscope objective 12 (more precisely from the optical surface thereof arranged furthest away on the object side).

In FIG. 1 the value $z_1$ designates the distance of the object plate 14 supporting the volume sample 16 from a fixed reference point on the microscope objective 12. This fixed reference point on the microscope objective 12 is given for example by a surface of the microscope objective 12 which contacts an objective nosepiece (not shown in FIG. 1). This value $z_1$ thus indicates the distance between the volume sample 16 and the microscope objective 12 and therefore represents a manipulated variable of the focusing device 22, also referred to below as the focusing distance. The focusing distance $z_1$ is therefore also a measure of the depth at which the object plane 28 lies inside the volume sample 16. This means that if the focusing distance $z_1$ changes, the sample depth to which the microscope objective 12 is focused inside the volume sample 16 changes to an equal extent.

Figure 2:
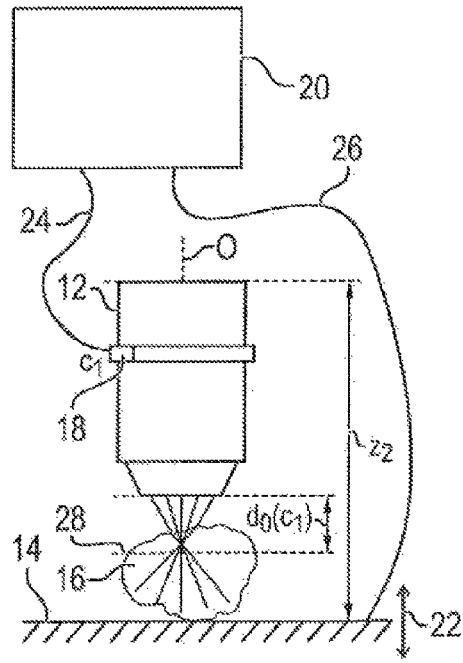
FIG. 2 is a schematic view corresponding to FIG. 1, in which the microscope objective according to an embodiment of the invention is focused on a second reference plane, without the imaging error being corrected by the correcting element.

In FIG. 2 a state is illustrated in which the microscope objective 12 is focused to a depth inside the volume sample 16 which corresponds to a focusing distance $z_2$ (which is smaller in this example). Accordingly, in the state according to FIG. 2, the object plane 28 lies deeper inside the volume sample 16 when viewed from above. This deeper plane defines a second reference plane.

Since in the state illustrated in FIG. 2 the path length of the light inside the volume sample 16, which light is coming from the object plane 28, is longer than in the state according to FIG. 1, a spherical aberration occurs as a result of the maladjustment of the index of refraction. This spherical aberration is indicated schematically in FIG. 2 by kinks in the light beams exiting the volume sample 16 in the direction of the microscope objective 12. Since in FIG. 2 the correcting element 18 is still in the reference setting $c_1$ optimized for the state according to FIG. 1, the spherical aberration is still not corrected in FIG. 2.

FIG. 3 shows how the spherical aberration illustrated in FIG. 2 is corrected by an adjustment of the correcting element 18. Thus in FIG. 3 a second reference setting $c_2$, which is different from the setting $c_1$ and by which the spherical aberration is corrected in the best possible manner for the second reference plane 28, is chosen for the correcting element 18. However, the object focal distance of the microscope objective 12 is changed relative to the desired target focal distance by the movement of the correcting element 18 into the reference setting $c_2$. This changed object focal distance is designated by $d_0(c_2)$ in FIG. 3. Thus in FIG. 2 the object plane 28 is shifted upwards along the optical axis O by an amount which is given by $$\Delta d_0(c_1, c_2) = d_0(c_2) - d_0(c_1).$$

Finally, FIG. 4 shows how the undesirable shifting of the object plane 28 due to the change in the object focal distance is compensated for. Thus, by means of the focusing device 22, the focusing distance $z_2$ given in FIG. 3 is reduced in FIG. 4 by the change to the object focal distance caused by the correcting element 18, i.e. $\Delta d_0(c_1, c_2)$. This means that in the example according to FIG. 4, the object plate 14 is shifted upwards by the amount $\Delta d_0(c_1, c_2)$ along the optical axis O. As a result the originally sought object plane 28 can again be approached inside the volume sample 16.

Figure 5:
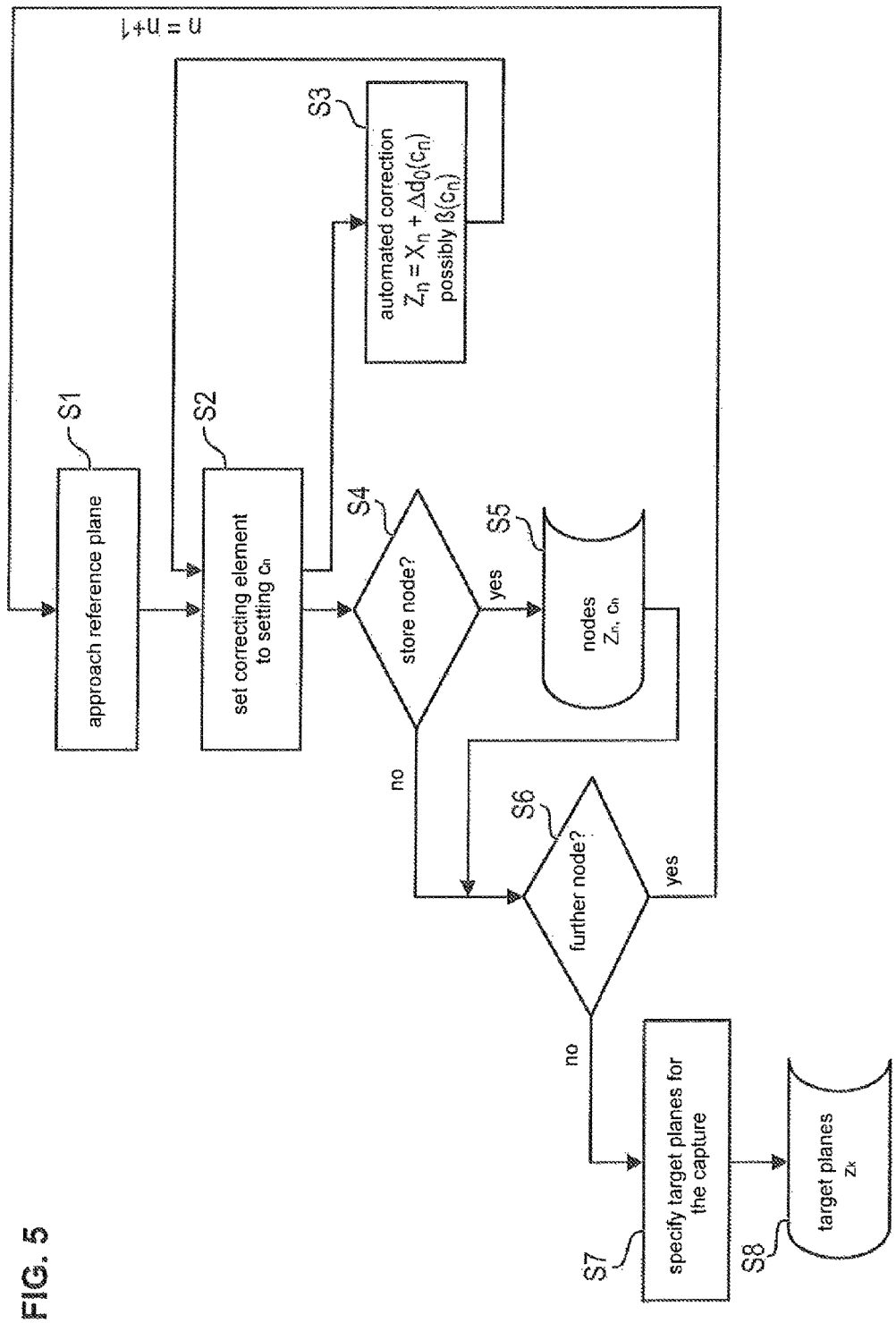
FIG. 5 is a flow chart showing method steps for setting up the microscope according to an embodiment of the invention.

FIG. 5 shows a flow diagram which shows purely by way of example the setting up of the microscope 10 which is performed before the image is actually captured and serves in particular to establish the reference planes and to determine for these reference planes the reference settings for the correcting element and the reference focal distance deviations relative to the target focal distance. Reference magnification deviations are optionally also taken into consideration if deviations of the object focal length and therefore deviations of the magnification relative to a target magnification are also caused by the adjustment of the correcting element 18.

In step S1, a reference plane $X_n$ is approached, whereby the microscope objective 12 is focused on this reference plane $X_n$ by means of the focusing device 22. In step S2 the correcting element 18 is moved into a reference setting $c_n$. In this reference setting $c_n$ the spherical aberration which is caused by a maladjustment of the index of refraction is corrected in the best possible manner for the reference plane $X_n$. If a change $\Delta d_0(c_n)$ in the object focal distance occurs due to the adjustment of the correcting element 18, the object plane is readjusted according to FIG. 4. Thus the value $\Delta d_0(c_n)$ corresponds to the reference focal distance deviation. Moreover, if a change in the object focal length and thus a change in the magnification is caused by the adjustment of the correcting element 18, a reference magnification deviation $\beta(c_n)$ is additionally determined.

The steps S2 and S3 are performed as explained above with reference to FIGS. 1 to 4. In this case it is particularly advantageous to carry out step S3 in real time.

In step S4 it is decided whether or not the values $c_n$, $Z_n$ and optionally $\beta(c_n)$ determined in steps S2 and S3 should be stored as node n, where n designates an integral control variable. If said values are to be stored, this storage takes place in step S5, and the sequence is continued with step S6. If the node n is not to be stored, the sequence directly continues with step S6.

In step S6 it is determined whether a further node should be determined. If this is the case, the control variable n is increased by 1 (n=n+1), and the control sequence returns to step S1. If no further node is to be determined, in step S7 the target planes $z_k$ on which the microscope objective 12 is to be focused when subsequently imaging the volume sample 16 are specified and stored in step S8.

Figure 6:
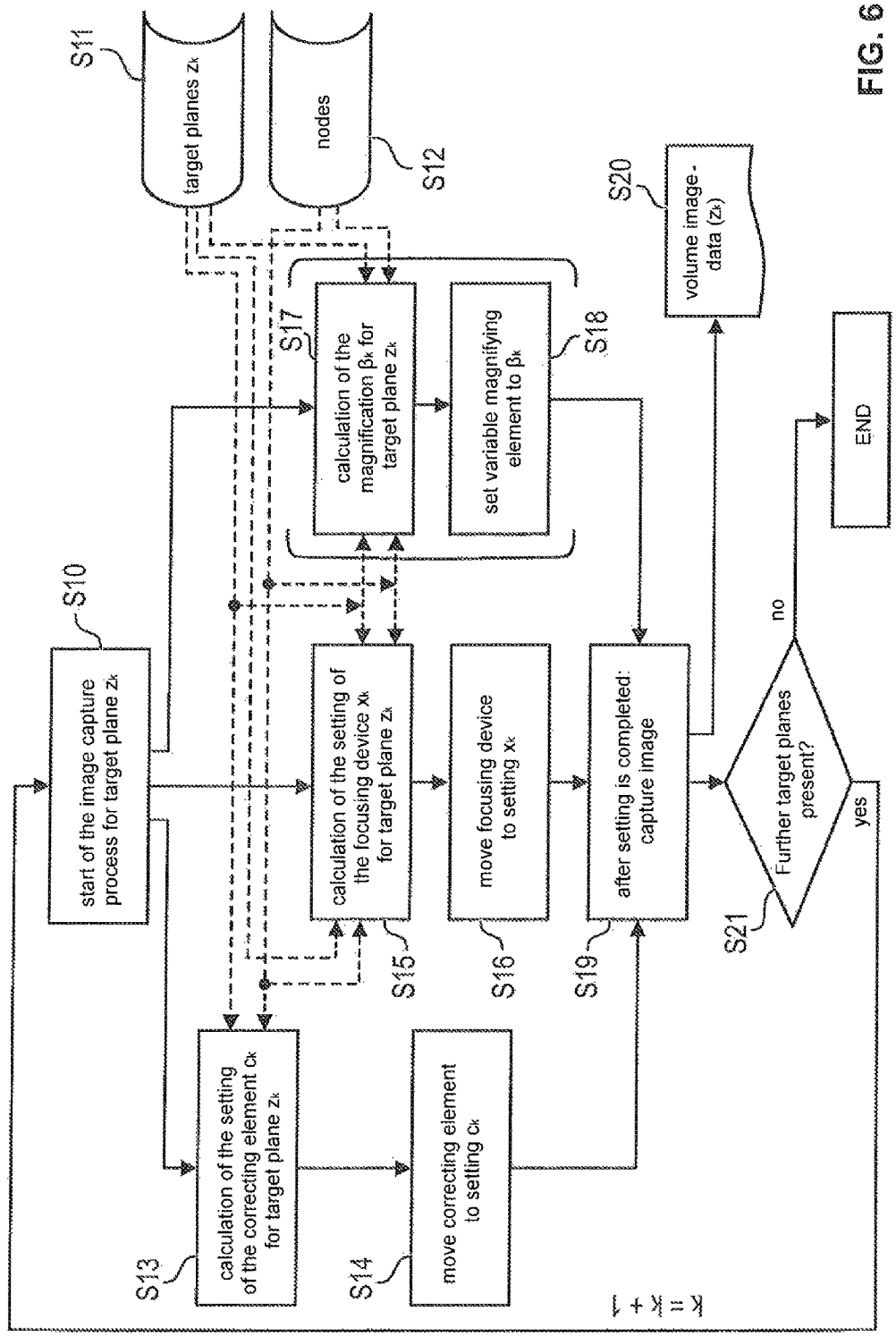
FIG. 6 is a flow chart showing method steps according to an embodiment of the invention for imaging the volume sample by means of the microscope set up according to FIG. 5.

FIG. 6 shows a flow diagram which indicates by way of example how the volume image is captured based on the setting up of the microscope 10 carried out in FIG. 5.

In step S10, the image capturing process for a target plane $z_k$ is started, wherein k designates an integral control variable. In step S11, a piece of information that has previously been stored during the setting up of the microscope 10 (S8 in FIG. 5) and identifies the target plane $z_k$ is read out. In step S12 the nodes associated with the individual reference planes are provided, i.e. the reference settings $c_n$ and the reference focal distance deviations $Z_n$ (S5 in FIG. 5). The information provided in steps S11 and S12 is subsequently used in order to determine the appropriate target values for the selected target plane $z_k$, specifically the target setting $c_k$ for the correcting element 18, the target focal distance deviation $x_k$, by which the focusing device 22 is actuated, and (optionally) the target magnification deviation $\beta_k$, by which a variable magnifying element is actuated.

In particular in step S13 the target setting $c_k$ for the correcting element 18 is calculated for the target plane $z_k$. In step S14 the correcting element 18 then moves into the target setting $c_k$ in order to correct the spherical aberration in the target plane $z_k$ in the best possible manner.

In step S15 the reference focal distance deviation $x_k$ is calculated for the target plane $z_k$. In step S16 the focusing device 22 is adjusted according to the reference focal distance deviation $x_k$.

In step S17 the target magnification deviation $\beta_k$ is calculated for the target plane $z_k$. In step S18 the variable magnifying element is then adjusted according to the target magnification deviation $\beta_k$.

In this case the processing branch formed by steps S13 and S14 for adjustment of the correcting element 18, the processing branch formed by steps S15 and S16 for adjustment of the focusing device 22 as well as (optionally) the processing branch formed by steps S17 and S18 for adjustment of the variable magnifying element are performed simultaneously. These processing branches together lead to step S19, in which, after the target values $c_k$, $z_k$ and $\beta_k$ relating to the target plane $z_k$ have been set, an image of the target plane $z_k$ is captured. The volume image data thus generated are stored in step S20. In step S21 an enquiry is made as to whether a further target plane should be captured. If this is the case, the control variable k is increased by 1 (k=k+1), and the image capture process explained above returns to step S1. If no further target plane is to be captured, the process ends.

It should be pointed out that the sequences explained with reference to FIGS. 5 and 6 explains should be understood only by way of example. Other modifications are conceivable, for example capturing a volume image, in which only the setting of the correcting element 18 is taken into consideration, but not a change in the object focal distance and a change in the microscope magnification as a result of the adjustment of the correcting element 18. In this case the two processing branches formed by steps S15 and S16 or S17 and S18 can be omitted. However, it is also possible to provide additional, simultaneously performed processing branches, such as setting a target control parameter relating to the target plane, for example an illumination light power, on the basis of previously defined reference control parameters relating to the reference planes.

In FIGS. 7 to 10 different embodiments of the microscope 10 according to the invention are illustrated.

Figure 7:
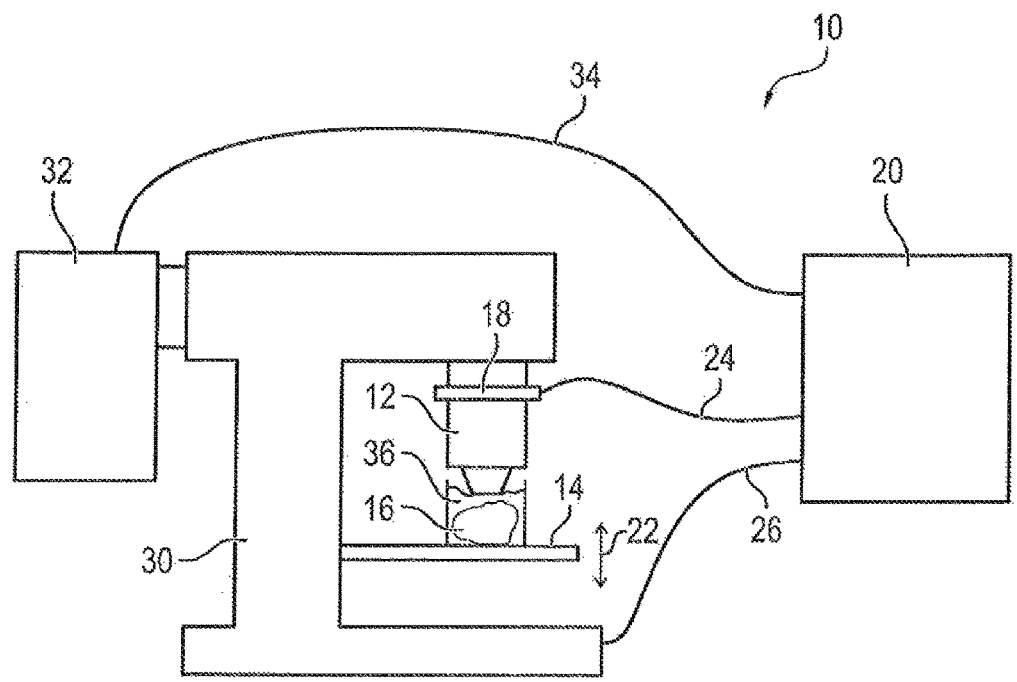
FIG. 7 shows the microscope according to an embodiment of the invention which has an upright microscope stand and an adjustable object plate as a focusing device.

The microscope 10 according to FIG. 7 comprises, in addition to the microscope components already described with reference to FIGS. 1 and 4, an upright microscope stand 30 as well as a documentation unit 32 which is coupled by means of a connecting line 34 to the control unit 20. In the embodiment according to FIG. 7, the focusing device 22 (as in the embodiment according to FIGS. 1 to 4) is provided by the object plate 14 which can be moved along the optical axis by a motor. FIG. 7 also shows an immersion medium 36 in which the volume sample 16 is embedded. The index of refraction of the immersion medium 36 is chosen so that it is adapted in the best possible manner to the index of refraction of the volume sample 16.

Figure 8:
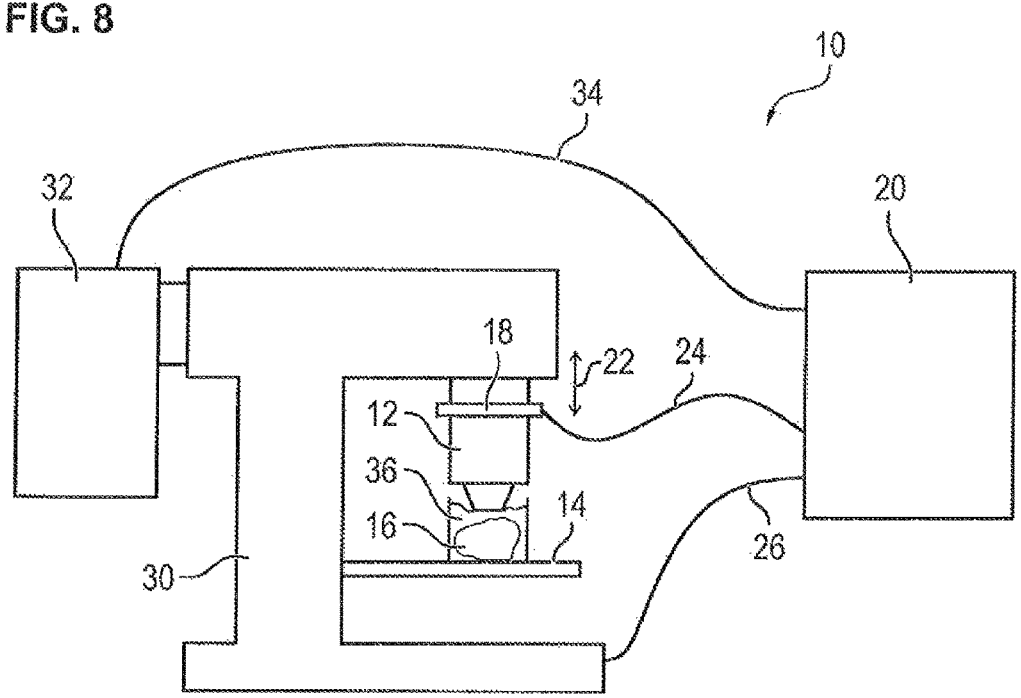
FIG. 8 shows the microscope according to an embodiment of the invention which has an upright microscope stand and an adjustable objective nosepiece as a focusing device.

The embodiment according to FIG. 8 is modified by comparison with the embodiment illustrated in FIG. 7 so that the focusing device 22 is not formed by an adjustable object plate, but by an objective nosepiece which can be moved along the optical axis on which the microscope objective 12 is held.

Figure 10:
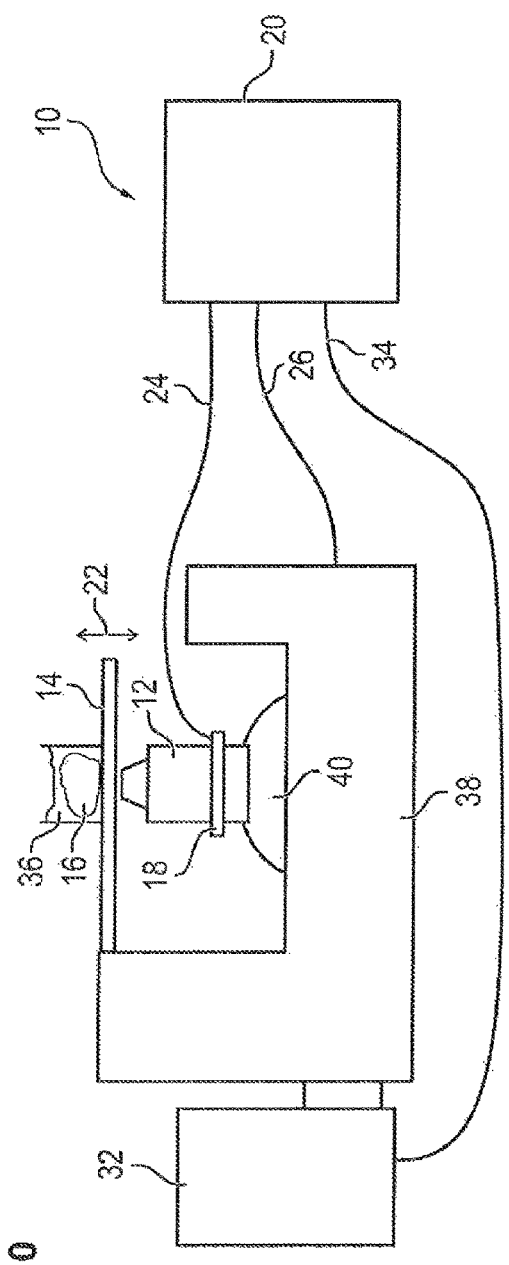
FIG. 10 shows the microscope according to an embodiment of the invention which has an inverted microscope stand and an adjustable object plate as a focusing device.

On the other hand, the embodiment according to FIG. 10 has an inverted microscope stand 38. In this embodiment the focusing device 22 is again formed by an objective nosepiece 40 which can be moved along the optical axis.

Figure 9:
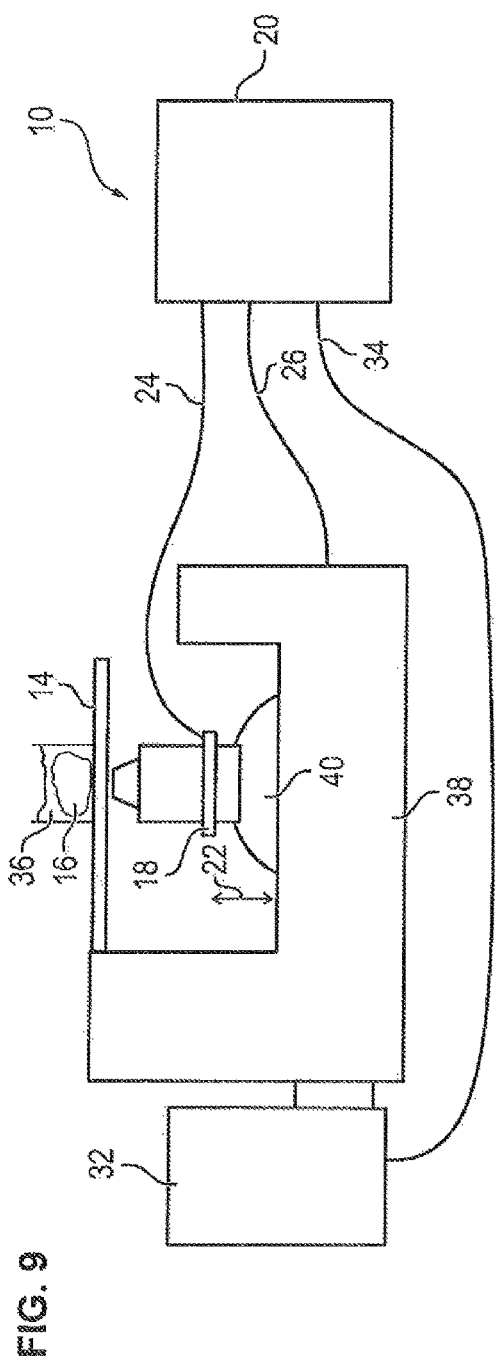
FIG. 9 shows the microscope according to an embodiment of the invention which has an inverted microscope stand and an adjustable objective nosepiece as a focusing device.

Finally, the embodiment according to FIG. 10 is modified by comparison with the embodiment illustrated in FIG. 9 in that the focusing device 22 is again realized by the object plate 14 which can be moved along the optical axis.

The embodiments according to FIGS. 7 to 10 should also be understood merely by way of example. In particular the invention is not limited to a specific type of microscope. On the contrary, it can be used in the most varied methods of microscopy, for example in wide field microscopy, in confocal microscopy, in multiphoton microscopy or in light sheet microscopy.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

10 microscope
12 microscope objective
14 object plate
16 volume sample
18 correcting element
20 control unit
22 focusing device
24 connecting line
26 connecting line
28 object plane
30 upright microscope stand
32 documentation unit
34 connecting line
36 immersion medium
38 inverted microscope stand
40 objective nosepiece

The invention claimed is:

1. A method for microscopically imaging a volume sample, the method comprising:
   focusing a microscope objective having a correcting element successively in at least two reference planes which are located within the volume sample at different volume sample depths along an optical axis of the microscope objective;

determining, for each reference plane, a reference setting of the correcting element in which an imaging error which is dependent upon the volume sample depth is corrected by the correcting element;

determining, on the basis of the reference settings, for a target plane in the volume sample, a target setting for the correcting element in which the imaging error occurring at the volume sample depth of the target plane is corrected by the correcting element;

determining for each reference plane, a reference magnification deviation which is a deviation of a magnification of the microscope objective relative to a target magnification caused by the correcting element in the particular reference setting, and, determining, on the basis of the reference magnification deviations for each reference plane, a target magnification deviation for the target plane, wherein the target magnification deviation represents the deviation, caused by the correcting element in the target setting, of the magnification relative to the desired magnification;

adjusting a variable magnifying element taking account of the target magnification deviation; and focusing the microscope objective on the target plane and bringing the correcting element into the target setting in order to image the volume sample.

2. The method according to claim 1, wherein for each reference plane a reference focal distance deviation is determined, wherein the reference focal distance deviation for each reference plane is a deviation of the object focal distance of the microscope objective relative to a target focal distance caused by the correcting element in the particular reference setting, and wherein on the basis of the reference focal distance deviation for each focal plane, a target focal distance deviation is determined for the target plane, wherein the target focal distance deviation represents the deviation, caused by the correcting element in the target setting, of the object focal distance relative to the target focal distance; and wherein the microscope objective is focused on the target plane taking account of the target focal distance deviation.

3. The method according to claim 2, wherein a focal distance rule is determined on the basis of the reference focal distance deviation for each reference plane, wherein the focal distance rule indicates a deviation of the object focal distance on the basis of the setting of the correcting element, and wherein the target focal distance deviation is determined on the basis of this focal distance rule.

4. The method according to claim 3, wherein the target focal distance deviation is determined by interpolation on the basis of the focal distance rule.

5. The method according to claim 1, wherein a correction rule is determined on the basis of the reference settings of the correcting element, wherein the correction rule indicates a setting, which is provided for correcting the imaging error, of the correcting element on the basis of the volume sample depth, and wherein the target setting of the correcting element is determined using the correction rule.

6. The method according to claim 5, wherein the target setting of the correcting element is determined by interpolation using the correction rule.

7. The method according to claim 1, wherein a reference control parameter is specified for each reference plane; and wherein, on the basis of the reference control parameter specified for each reference plane, a target control parameter is determined and set for the target plane.

8. The method according to claim 7, wherein the at least one reference control parameter specified for each reference plane includes illumination light power.

9. The method according to claim 1, wherein the at least two reference planes comprise a plurality of planes which are equidistant along the optical axis.

10. The method according to claim 1, wherein the microscope objective is moved along the optical axis relative to the volume sample for focusing.

11. The method according to claim 1, wherein a volume sample region to be imaged is delimited along the optical axis by the reference plane located at the lowest volume sample depth and the reference plane located at the highest volume sample depth.

12. A microscope for imaging a volume sample, the microscope comprising
a microscope objective;
a correcting element;
a focusing device; and
a control unit,
wherein the control unit is operable to focus the microscope objective using the focusing device successively on at least two reference planes which are located within the volume sample at different volume sample depths along an optical axis of the microscope objective;
wherein the control unit is further operable to determine, for each reference plane, a reference setting of the correcting element, in which an imaging error which is dependent upon the volume sample depth is corrected by the correcting element;
wherein the control unit is further operable to determine, for a target plane in the volume sample, a target setting for the correcting element, in which the imaging error occurring at the volume sample depth of the target plane is corrected by the correcting element on the basis of the determined reference settings;
wherein the control unit is further operable to determine, for each reference plane, a reference magnification deviation which is a deviation of a magnification of the microscope objective relative to a target magnification caused by the correcting element in the particular reference setting, and,
wherein the control unit is further operable to determine, on the basis of the reference magnification deviations for each reference plane, a target magnification deviation for the target plane, wherein the target magnification deviation represents the deviation, caused by the correcting element in the target setting, of the magnification relative to the desired magnification;
wherein the control unit is further operable to adjust a variable magnifying element taking account of the target magnification deviation; and
wherein the control unit is operable to focus the microscope objective on the target plane using the focusing device in order to image the volume sample and moves the correcting element into the target setting.

13. The microscope according to claim 12, wherein the correcting element comprises a lens unit contained in the microscope objective and a drive unit for moving the lens unit along the optical axis.

14. The microscope according to claim 13, wherein the drive unit comprises a correction collar which is arranged on a housing of the microscope objective and is rotatable about the optical axis, wherein the rotary movement of the correction collar is convertible into a displacement movement of the lens unit along the optical axis.

15. The microscope according to claim 12, wherein the focusing device can be adjusted by a motor for at least one of adjusting the microscope objective or an object plate supporting the volume sample.

16. A method for microscopically imaging a volume sample, the method comprising:

focusing a microscope objective having a correcting element successively in at least two reference planes which are located within the volume sample at different volume sample depths along an optical axis of the microscope objective;

determining, for each reference plane, a reference setting of the correcting element in which an imaging error which is dependent upon the volume sample depth is corrected by the correcting element;

determining, on the basis of the reference settings, for a target plane in the volume sample, a target setting for the correcting element in which the imaging error occurring at the volume sample depth of the target plane is corrected by the correcting element, wherein a reference control parameter is specified for each reference plane; and wherein, on the basis of the reference control parameter specified for each reference plane, a target control parameter is determined and set for the target plane, the reference control parameter including illumination light power; and focusing the microscope objective on the target plane and bringing the correcting element into the target setting in order to image the volume sample.

\* \* \* \* \*